(12) United States Patent
Yamazaki et al.

(10) Patent No.: US 7,361,117 B2
(45) Date of Patent: Apr. 22, 2008

(54) DIFFERENTIAL LIMITER

(75) Inventors: Nobushi Yamazaki, Tochigi (JP); Kazuo Kanazawa, Tokyo (JP); Hiroshi Yamashita, Tokyo (JP); Mamoru Murakami, Tokyo (JP)

(73) Assignee: GKN Driveline Torque Technology KK, Tokyo (JP)

( * ) Notice: Subject to any disclaimer, the term of this patent is extended or adjusted under 35 U.S.C. 154(b) by 106 days.

(21) Appl. No.: 11/403,505

(22) Filed: Apr. 12, 2006

(65) Prior Publication Data

US 2006/0240935 A1   Oct. 26, 2006

(30) Foreign Application Priority Data

Apr. 20, 2005   (JP)   ............... 2005-122454

(51) Int. Cl.
*F16H 48/06*   (2006.01)
*F16H 3/44*   (2006.01)

(52) U.S. Cl. ...................... 475/249; 475/300
(58) Field of Classification Search ............... None
See application file for complete search history.

(56) References Cited

U.S. PATENT DOCUMENTS

| | | | | |
|---|---|---|---|---|
| 3,457,807 A | * | 7/1969 | Altmann | ............... 475/235 |
| 5,102,378 A | * | 4/1992 | Gobert | ............... 475/231 |
| 5,464,084 A | * | 11/1995 | Aoki et al. | ............... 192/35 |
| 6,796,412 B2 | * | 9/2004 | Teraoka | ............... 192/35 |
| 2002/0055409 A1 | * | 5/2002 | Kanazawa | ............... 475/249 |
| 2006/0073931 A1 | * | 4/2006 | Teraoka | ............... 475/231 |

FOREIGN PATENT DOCUMENTS

| | | | | |
|---|---|---|---|---|
| JP | 410030656 A | * | 2/1998 | |
| JP | 2004-116594 | | 4/2004 | |

* cited by examiner

*Primary Examiner*—Roger Pang
(74) *Attorney, Agent, or Firm*—Morrison & Foerster LLP

(57) ABSTRACT

A differential limiter, including: differential mechanism, including: input member, first output member, second output member, and differential gear connecting the above three members so that the above three members differentially rotate; shaft member connected to the first output member and serving as output member of driving force; first cam mechanism including: first cam face on the first output member, and second cam face on the shaft member, the first cam face and second cam face are oppositely connected with each other in axial direction, to cause first axial thrust force and second axial thrust force according to driving torque; and frictional clutch between two of the above three members, and transmitting a differential limit torque. The first axial thrust force of the first output member presses the frictional clutch from first axial end. The second axial thrust force of the shaft member presses the frictional clutch from second axial end.

7 Claims, 2 Drawing Sheets

US 7,361,117 B2

DIFFERENTIAL LIMITER

BACKGROUND OF THE INVENTION

1. Field of the Invention

The present invention relates to a differential limiter.

2. Description of the Related Art

Japanese Patent Application Laid-Open No. 2004-116594 (JP2004116594) discloses a differential limiter (referred to as "differential limiting device" in the abstract thereof). The above differential limiter includes: 1) a housing 1, 2) a left pressure ring 4 and a right pressure ring 5 which are connected to the housing 1 in such a manner as to move axially, 3) a differential mechanism having a pair of a left side gear 6 and a right side gear 7 which mesh with a pinion gear 3 supported to a pinion shaft 2, 4) a cam mechanism using a pair of a cam 4A and a cam 5A which are formed, respectively, i) between the left pressure ring 4 and the pinion shaft 2 and ii) between the right pressure ring 5 and the pinion shaft 2, and 5) a pair of a left clutch 8 and a right clutch 9 (frictional clutches) which are disposed, respectively, i) between the left side gear 6 and a cylindrical part of the housing 1 and ii) between the right side gear 7 and the cylindrical part of the housing 1. The cam mechanism operates according to a torque inputted from the housing 1 to both of the left pressure ring 4 and the right pressure ring 5 via the cam mechanism, then pressing and thereby clutching each of the left clutch 8 and the right clutch 9, thus bringing about a differential limiting torque. In general, the above differential limiter has a torque sensitive structure, bringing about a differential limiting function featuring a good response according to the torque (driving torque) inputted to the housing 1.

In the differential limiter according to the JP2004116594, however, an inner space of the housing 1 is widely occupied by the differential mechanism from a shaft core side to a radial outer side, thereby a space for the cam mechanism is limited to between an outer periphery of the differential mechanism and an inner periphery of the housing 1 (cylindrical part).

In addition, for avoiding the differential mechanism, the each of the left pressure ring 4 and the right pressure ring 5 has a periphery thereof by making a detour in an axial direction. Thereby, a thrust force and an opposite thrust force which are caused to the cam mechanism clutch the left clutch 8 and the right clutch 9 (frictional clutches) via, respectively, the left pressure ring 4 and the right pressure ring 5, to be inputted to both side wall plates of the housing 1.

As described above, the differential limiter according to the JP2004116594 has a complicated structure and is therefore likely to be large in size. In addition, the housing 1 having the side wall plates to which the thrust force and the opposite thrust force of the cam mechanism are inputted needs to increase strength according to the thus applied thrust force and opposite thrust force, thereby likely to be heavy.

SUMMARY OF THE INVENTION

It is therefore an object of the present invention to provide a differential limiter that suppresses a structure thereof from becoming complicated, large in size and heavy and stops an input of a thrust force and an opposite thrust force from a cam mechanism relative to a housing.

According to an aspect of the present invention, there is provided a differential limiter, comprising: 1) a differential mechanism, including: i) an input member for receiving a driving torque, ii) a first output member, iii) a second output member, and iv) a differential gear for connecting the input member, the first output member and the second output member in such a manner that the input member, the first output member and the second output member differentially rotate; 2) a shaft member connected to the first output member and serving as an output member of a driving force; 3) a first cam mechanism including: i) a first cam face formed on the first output member, and ii) a second cam face formed on the shaft member, the first cam face and the second cam face are so connected with each other as to oppose each other in an axial direction, to thereby cause respectively a first axial thrust force and a second axial thrust force according to the driving torque; and 4) a frictional clutch disposed between any two of the input member, the first output member and the second output member, and transmitting a differential limit torque, wherein the first axial thrust force caused to the first output member presses the frictional clutch from a first axial end, and the second axial thrust force caused to the shaft member presses the frictional clutch from a second axial end opposite to the first axial end.

The other object(s) and feature(s) of the present invention will become understood from the following description with reference to the accompanying drawings.

DESCRIPTION OF THE PREFERRED EMBODIMENTS

Figure 1:
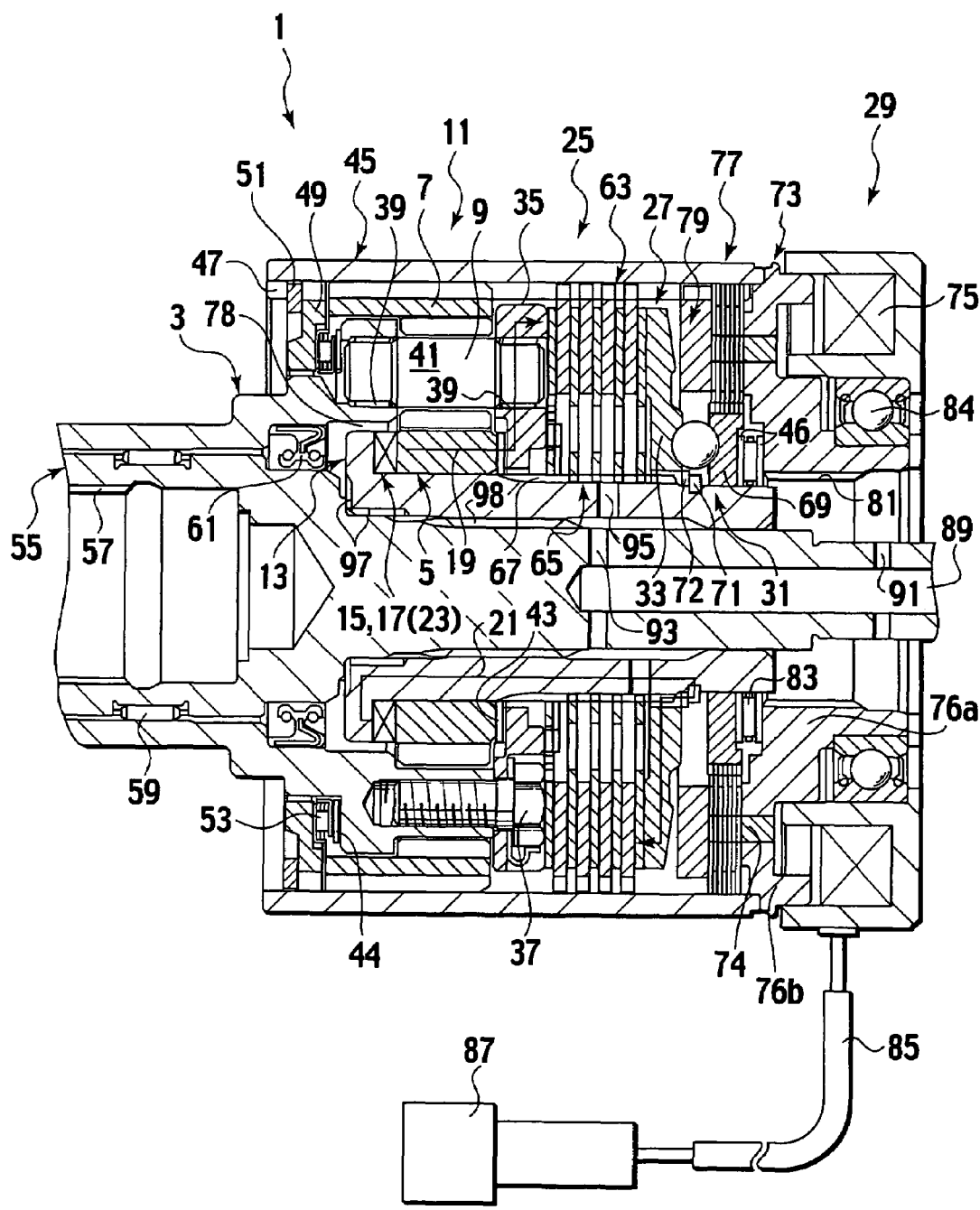
FIG. 1 is a cross sectional view of a differential limiter, according to an embodiment of the present invention.
Figure 2A:
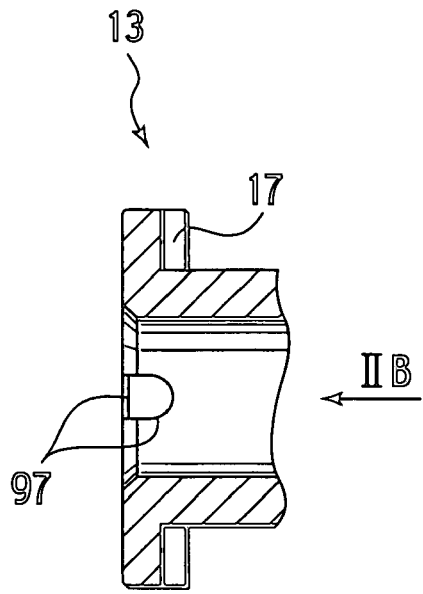
FIG. 2A is a longitudinal cross sectional view of a shaft member used for the differential limiter.
Figure 2B:
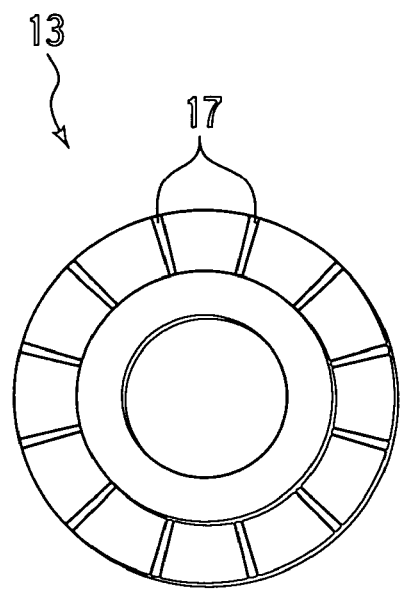
FIG. 2B is viewed in a direction of an arrow IIB in FIG. 2A.
Figure 3A:
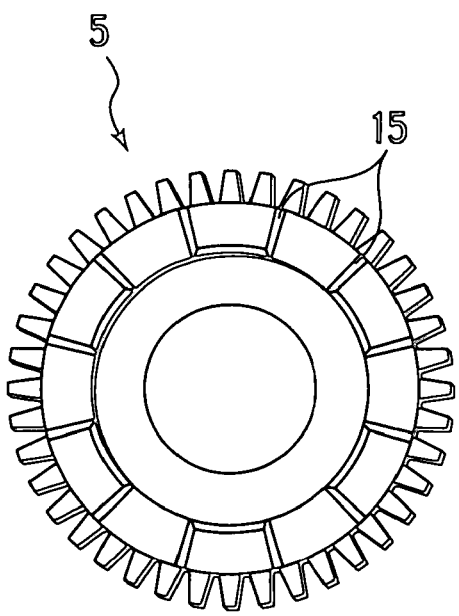
FIG. 3A is a longitudinal cross sectional view of a sun gear used for the differential limiter.
Figure 3B:
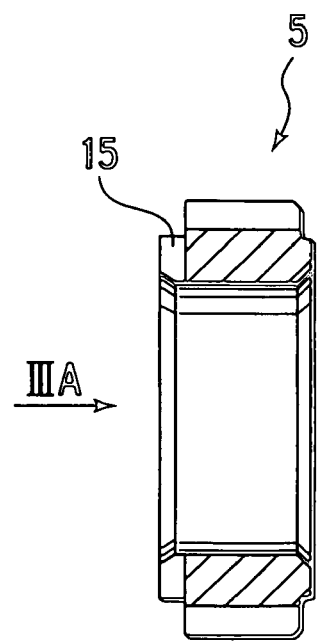
FIG. 3B is viewed in a direction of an arrow IIIB in FIG. 2A.

Referring to FIG. 1 to FIG. 3 (FIG. 3A and FIG. 3B), a differential limiter 1 is to be described, according to an embodiment of the present invention. In a four-wheel drive vehicle, the differential limiter 1 is a differential device (center differential) distributing a driving force of an engine (driving source, not shown) to a front wheel and a rear wheel. Hereinafter, left and right directions are those disclosed in FIG. 1, where the left direction in FIG. 1 is a frontward direction of the four-wheel drive vehicle.

[General Structure of Differential Limiter 1]

The differential limiter 1 includes: 1) a differential mechanism 11 including: i) an input member 3 to which a driving torque (driving force) of the engine (driving source, not shown) is inputted, ii) a first output member 5, iii) a second output member 7, and iv) a differential gear 9 for connecting the input member 3, the first output member 5 and the second output member 7 in such a manner that the input member 3, the first output member 5 and the second output member 7 differentially rotate, 2) a shaft member 13 connected to the first output member 5 and serving as an output side member of the driving force, 3) a first cam mechanism 23 including: a first cam face 15 formed on the first output member 5 and a second cam face 17 formed on the shaft member 13 which are so connected with each other as to oppose each other in an axial direction, to thereby cause, respectively, a first axial thrust force 19 and a second axial thrust force 21 (otherwise referred to as "opposite thrust force") according to the driving torque, and 4) a main clutch 25 (frictional clutch) having a multiple-disc structure, disposed between any two of the input member 3, the first output member 5 and the second output member 7 (the first output member 5 and the second output member 7), and transmitting a differential limiting torque.

The first axial thrust force 19 caused to the first output member 5 presses the main clutch 25 from a first axial end (leftward), and the second axial thrust force 21 caused to the shaft member 13 presses the main clutch 25 from a second axial end (rightward). The input member 3 is a planetary carrier 3, the first output member 5 is a sun gear 5, the second output member 7 is an internal gear 7, and the differential gear 9 is a pinion 9 configured to serve as a planetary gear 9 supported to the planetary carrier 3. The sun gear 5 is configured to press, by means of the first axial thrust force 19, the main clutch 25 from the first axial end (leftward) via the planetary carrier 3. The shaft member 13 is configured to press, by means of the second axial thrust force 21, the main clutch 25 from the second axial end (rightward) via a pressure plate 27 (press member) unitedly movable in the axial direction.

In addition, there are provided an actuator 29 capable of externally controlling a clutching force of the main clutch 25, and a ball cam 31 (second cam mechanism) for amplifying an operational force of the actuator 29 to thereby apply the clutching force to the main clutch 25. In combination with the second axial thrust force 21, a cam thrust force 33 (clutching force) of the ball cam 31 presses the main clutch 25 via the pressure plate 27.

[Specific Structure of Differential Limiter 1]

The planetary carrier 3 (input member) is a hollow member, and connects to the engine side (not shown) via a transmission (not shown). In addition, a planetary carrier 35 mates with the planetary carrier 3 by means of a bolt 37, and the planetary carrier 3 and the planetary carrier 35 bear both ends of a pinion shaft 41 via respective first bearings 39, 39. The planetary gear 9 serving as the differential gear 9 is united with the pinion shaft 41.

The sun gear 5 (first output member) is a hollow member and meshes with the planetary gear 9. Between the sun gear 5 and the planetary carrier 35, there is provided an annular washer 43 for transmitting the second axial thrust force 21 to the main clutch 25 side.

The internal gear 7 (second output member) has an outer periphery connected to a first spline part 47 disposed on an inner periphery of a cylindrical member 45 (housing), and meshes with the planetary gear 9. In a front end opening of the cylindrical member 45, a side wall plate 49 connects to the first spline part 47 and is positioned by means of a snap ring 51. In addition, between the side wall plate 49 and the planetary carrier 3, there are provided a second bearing 53 and a washer 44 which stop a slidable rotation relative to each other when receiving the cam thrust force 33 (in addition, including a cam reactive force—to be described afterward).

An output shaft 55 serving as a second output pass member is splined to an inner periphery of the shaft member 13. On an inner periphery of a front end part of the output shaft 55, there is provided a second spline part 57 serving as a connector to one of a front wheel (not shown) and a rear wheel (not shown), for example, the front wheel. The output shaft 55 is supported to an inner periphery of the planetary carrier 3 via a third bearing 59. Between the output shaft 55 and the planetary carrier 3, there is provided an oil seal 61 for defining a lubricating environment on both sides in the axial direction on an outer periphery of the output shaft 55.

As shown in FIG. 2 and FIG. 3, the first cam mechanism 23 includes, respectively, i) the second cam face 17 formed on the shaft member 13 and ii) the first cam face 15 formed on the sun gear 5. The first cam face 15 and the second cam face 17 mesh with each other in such a manner as to oppose each other in the axial direction, to thereby connect the sun gear 5 with the shaft member 13. According to the inputted driving torque, the first cam face 15 and the second cam face 17 cause, respectively, the first axial thrust force 19 and the second axial thrust force 21.

The main clutch 25 is so configured as to i) connect an outer plate 63 to the first spline part 47 of the cylindrical member 45, and ii) connect an inner plate 65 to a third spline part 67 disposed on an outer periphery the shaft member 13. In addition, the most frontward inner plate 65 is splined to the planetary carrier 35, thereby stopping a mutual slidable rotation.

The ball cam 31 is disposed between the pressure plate 27 and a cam ring 69. The pressure plate 27 connects to the third spline part 67 of the shaft member 13. For transmitting the second axial thrust force 21 to the pressure plate 27, the shaft member 13 includes a snap ring 71 and an annular ring 72 which are disposed adjacent to each other.

The actuator 29 includes: i) a rotor 73, ii) an electromagnet 75, iii) a pilot clutch 77 including a multiple of discs, iv) an armature 79, v) a controller (not shown), and the like.

From an outer peripheral direction, the rotor 73 is welded to a rear end opening of the cylindrical member 45 in such a manner as to block the rear end opening. In the center of a radial directional wall of the rotor 73, a ring 74 made of copper or stainless steel is joined to an inner annular member 76a and an outer annular member 76b each made of magnetic material. On an inner periphery of the rotor 73, there is provided a fourth spline part 81 serving as a connector to one of the front wheel (not shown) and the rear wheel (not shown), for example, the rear wheel. Between the cam ring 69 and the rotor 73, there are provided a fourth bearing 83 and a pair of washers 46 for bearing a cam reactive force (thrust reactive force) of the ball cam 31. The electromagnet 75 is supported to the rotor 73 by means of a fifth bearing 84. A lead wire 85 of the electromagnet 75 is pulled outward via a connector 87, and connects to a battery (not shown) of an axle (not shown) via the controller (not shown).

The output shaft 55 has an axial oil pass 89, a radial oil pass 91 and a radial oil pass 93. The shaft member 13 has a radial oil pass 95 substantially opposing the radial oil pass 93. At a front end of the shaft member 13, there is defined an oil groove 97 including an axial groove and a radial groove which pass with each other. A centrifugal force causes oil in the axial oil pass 89 to flow out of the radial oil pass 91, to thereby lubricate and cool the fourth bearing 83. Oil from the axial oil pass 93 lubricates and cools the main clutch 25 side via the radial oil pass 95, moves to the oil groove 97 side via a spline part 98 between the output shaft 55 and the shaft member 13. Then, from a space 78 formed between the shaft member 13 and the planetary carrier 3, the above oil enters a part where the sun gear 5 and the planetary gear 9 mesh with each other, to thereby lubricate and cool the differential mechanism 11.

From the pinion shaft 41 via the planetary gear 9, the engine's driving force inputted to the planetary carrier 3 and the planetary carrier 35 is distributed to the sun gear 5 and the internal gear 7. The engine's driving force thus distributed to the sun gear 5 is transmitted to the front wheel via the sun gear 5, the first cam mechanism 23, the shaft member 13 and the second spline part 57, while the engine's driving force thus distributed to the internal gear 7 is transmitted to the rear wheel via the cylindrical member 45 and the fourth spline part 81.

Then, as described above, after receiving a transmission torque according to the wheel's ground resistance to a road face, the first cam mechanism 23 in a driving force-transmitting pass of the sun gear 5 can make an operation. As shown in FIG. 1, the thus caused first axial thrust force 19 presses the main clutch 25 from leftward via the sun gear 5, the annular washer 43 and the planetary carrier 35, while the thus caused second axial thrust force 21 presses the main clutch 25 from rightward via the shaft member 13, the snap ring 71 and the pressure plate 27, to thereby limit the differential between the front wheel and the rear wheel (between the shaft member 13 and the cylindrical member 45) by means of the differential limiting torque of the clutched main clutch 25.

The thus caused first axial thrust force 19 and second axial thrust force 21 vary according to the transmission torque passing through the first cam mechanism 23. Therefore, a differential limiting function caused to the main clutch 25 by a clutching force of the first cam mechanism 23 is torque sensitive.

In addition, as described above, the first axial thrust force 19 and second axial thrust force 21 of a torque sensitive differential limiting function are offset in a closed loop including the sun gear 5, the annular washer 43, the planetary carrier 35, the main clutch 25, the pressure plate 27, the snap ring 71 and the shaft member 13, thereby causing no influence to an outer part of the closed loop. With the above offsetting, the cylindrical member 45, the side wall plate 49 and the rotor 73 can be free from any parts for bearing the first axial thrust force 19 and second axial thrust force 21.

In addition, as shown in FIG. 1, the first axial thrust force 19 and the second axial thrust force 21 each operate radially inside (shaft core side) of the differential mechanism 11.

In addition, with the controller (not shown) exciting the electromagnet 75 by means of the battery (not shown), the armature 79 is absorbed rightward, to thereby clutch the pilot clutch 77. Then, a torque is applied to the ball cam 31 disposed between the shaft member 13 side and the cylindrical member 45 side, to thereby operate the ball cam 31. The cam thrust force 33 thus caused presses the pressure plate 27 leftward. Then, the above press force is inputted from the planetary carrier 35 and planetary carrier 3 (which are disposed on the back face of the main clutch 25) via the second bearing 53 to the side wall plate 49 and the snap ring 51, to thereby clutch the main clutch 25, thus causing the differential limiting torque. Herein, the cam reactive force of the ball cam 31 is inputted from the fourth bearing 83 to the rotor 73.

Adjusting an absorbing force of the armature 79 by varying exciting current of the electromagnet 75 varies a sliding ratio of the pilot clutch 77, to thereby vary the cam thrust force 33 of the ball cam 31, thus adjusting the differential limiting torque caused by the main clutch 25.

In addition, stopping the exciting of the electromagnet 75 unclutches the pilot clutch 77 to thereby vanish the cam thrust force 33 of the ball cam 31. With this, the main clutch 25 is unclutched, thus stopping the differential limiting function of the electromagnet 75.

In addition, the differential limiting function of the electromagnet 75 can be implemented substantially simultaneously with the differential limiting function of the first cam mechanism 23.

[Effect of the Differential Limiter 1]

With the differential limiter 1 having the above structure, the first cam mechanism 23 also serving as a connector for connecting the sun gear 5 with the shaft member 13 in an output pass of the sun gear 5 can be easily and compactly configured accordingly.

In addition, the first axial thrust force 19 and the second axial thrust force 21 which are caused by the first cam mechanism 23 implementing the torque sensitive differential limiting function press the main clutch 25 from opposing directions to thereby clutch the main clutch 25, thus increasing utilization efficiency of the first axial thrust force 19 and the second axial thrust force 21 and bringing about a sufficient differential limiting force.

In addition, in the closed loop including the sun gear 5, the annular washer 43, the planetary carrier 35, the main clutch 25, the pressure plate 27, the snap ring 71 and the shaft member 13, the first axial thrust force 19 and second thrust force 21 thereof are offset, thus eliminating the need for providing on the cylindrical member 45 side any parts for bearing the first axial thrust force 19 and second axial thrust force 21, accordingly suppressing the differential limiter 1 from becoming complicated, larger in size or heavier.

In addition, the first axial thrust force 19 and the second thrust force 21 are so configured as to operate in the differential mechanism 11, preventing differential limiter 1 from being complicated on the outer periphery of the differential mechanism 11.

The externally controllable electromagnet 75 operates the main clutch 25, to thereby bring about the differential limiting function which is different from that caused by the torque sensitive differential limiting function, moreover, the second cam mechanism 31 and the electromagnet 75 (the ball cam 31) commonly use the main clutch 25, thus suppressing the differential limiter 1 (featuring the torque sensitive differential limiting function and the externally controllable differential limiting function) from becoming large in size.

Moreover, in a range where a differential limit control area by the electromagnet 75 (the ball cam 31) serving as an actuator 75 overlaps a torque sensitive differential limit control area by the first cam mechanism 23, suppressing a differential frequency of the electromagnet 75 can accordingly decrease the load and driving force loss of the electromagnet 75.

In addition, the first cam mechanism 23 and the electromagnet 75 (the ball cam 31) commonly use the pressure plate 27 and the press pass, thereby suppressing increase in the number of components.

Other Embodiment Within the Scope of the Present Invention

Although the present invention has been described above by reference to a certain embodiment, the present invention is not limited to the embodiment described above. Modifications and variations of the embodiment described above will occur to those skilled in the art, in light of the above teachings.

With the differential limiter 1 under the present invention, the differential mechanism 11 is not limited to the one using the planetary carrier 3 according to the above embodiment. Otherwise, i) a bevel gear differential mechanism, ii) a parallel shaft mechanism (a differential mechanism including a pinion gear slidably and rotatably received in a receptor hole of a housing, with a pair of output side gears connected), iii) an intersecting shaft mechanism, iv) a balland-groove mechanism, v) a top-and-slant cam mechanism, and the like are allowed, provided that each of the above differential mechanisms i) to v) should connect an input member (for receiving a driving torque), a first output member, a second output member in such a manner that the input member, the first output member and the second output member differentially rotate, in other words each of the above differential mechanisms i) to v) should be capable of implementing the differential operation.

In addition, the frictional clutch 25 is not limited to the one having the multiple-disc structure, but another type of frictional clutch is allowed.

In addition, disposing of the frictional clutch 25 is not limited to between the first output member 5 and the second output member 7 according to the embodiment, but may be between i) the input member 3, 35 and ii) any one of the first output member 5 and the second output member 7.

In addition, the differential limiter 1 under the present invention is not limited to be of the center differential type that distributes the driving force to the front wheel and the rear wheel according to the embodiment, but may be of a wheel differential type (front differential and rear differential) distributing the driving force to a left wheel and a right wheel.

In addition, the actuator 75 for the second cam mechanism 31 is not limited to the electromagnet 75. A hydraulic pressure actuator (for example, a hydraulic piston or a hydraulic cylinder) or an electric motor actuator is allowed.

This application is based on a prior Japanese Patent Application No. P2005-122454 (filed on Apr. 20, 2005 in Japan). The entire contents of the Japanese Patent Application No. P2005-122454 from which priority is claimed are incorporated herein by reference, in order to take some protection against translation errors or omitted portions.

The scope of the present invention is defined with reference to the following claims.

What is claimed is:

1. A differential limiter, comprising:
   1) a differential mechanism, including:
      i) an input member for receiving a driving torque,
      ii) a first output member,
      iii) a second output member, and
      iv) a differential gear for connecting the input member, the first output member and the second output member in such a manner that the input member, the first output member and the second output member differentially rotate;
   2) a shaft member connected to the first output member and serving as an output member of a driving force;
   3) a first cam mechanism including:
      i) a first cam face formed on the first output member, and
      ii) a second cam face formed on the shaft member, the first cam face and the second cam face being so connected with each other as to oppose each other in an axial direction, to thereby cause respectively a first axial thrust force and a second axial thrust force according to the driving torque; and
   4) a frictional clutch disposed between the first output member and the second output member, and transmitting a differential limit torque, wherein
   the first axial thrust force caused to the first output member presses the frictional clutch from a first axial end, and
   the second axial thrust force caused to the shaft member presses the frictional clutch from a second axial end opposite to the first axial end.

2. The differential limiter as claimed in claim 1, wherein
   i) the input member is a planetary carrier,
   ii) the first output member is a sun gear,
   iii) the second output member is an internal gear, and
   iv) the differential gear is a pinion configured to serve as a planetary gear supported to the planetary carrier, and wherein
   the sun gear is configured to press, by means of the first axial thrust force, the frictional clutch from the first axial end via the planetary carrier, and
   the shaft member is configured to press, by means of the second axial thrust force, the frictional clutch from the second axial end via a press member unitedly movable in the axial direction.

3. The differential limiter as claimed in claim 1, further comprising:
   an actuator capable of externally controlling a clutching force of the frictional clutch, and
   a second cam mechanism for amplifying an operational force of the actuator, to thereby apply the clutching force to the frictional clutch.

4. The differential limiter as claimed in claim 3, wherein
   in combination with the second axial thrust force, a thrust force which is the clutching force of the second cam mechanism presses the frictional clutch via the press member.

5. The differential limiter as claimed in claim 2, wherein
   the first axial thrust force and the second axial thrust force vary according to a transmission torque passing through the first cam mechanism, and
   a differential limiting function caused to the frictional clutch by a clutching force of the first cam mechanism is, thereby, torque sensitive.

6. The differential limiter as claimed in claim 5, wherein
   the first axial thrust force and second axial thrust force of the torque sensitive differential limiting function are offset in a closed loop including the sun gear, an annular washer, a planetary carrier, the frictional clutch, the press member, a snap ring and the shaft member.

7. The differential limiter as claimed in claim 3, wherein
   the actuator includes an electromagnet, and
   the second cam mechanism is a ball cam.

* * * * *

UNITED STATES PATENT AND TRADEMARK OFFICE
CERTIFICATE OF CORRECTION

PATENT NO. : 7,361,117 B2  Page 1 of 1
APPLICATION NO. : 11/403505
DATED : April 22, 2008
INVENTOR(S) : Nobushi Yamazaki et al.

It is certified that error appears in the above-identified patent and that said Letters Patent is hereby corrected as shown below:

Title Page, Item (73) Assignee: should read:

-- (73) Assignee: GKN Driveline Torque Technology KK, Tochigi-shi, Japan
Fuji Jukogyo Kabushiki Kaisha, Tokyo, Japan --

Signed and Sealed this

First Day of December, 2009

David J. Kappos
*Director of the United States Patent and Trademark Office*